May 26, 1964
H. E. SCHIFTER
3,134,400
FLOW REGULATING DEVICE
Filed March 9, 1961
3 Sheets-Sheet 1
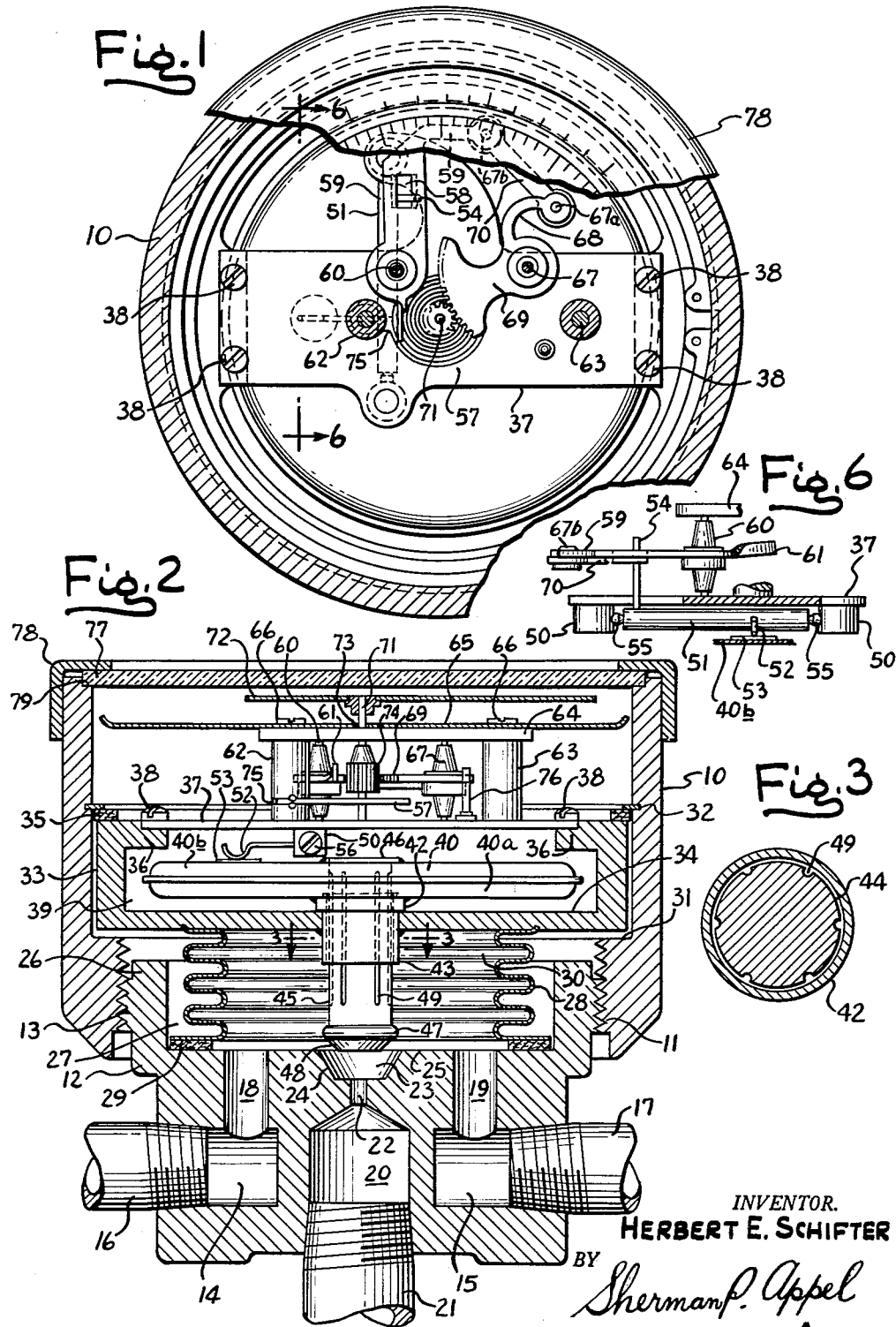
INVENTOR.
HERBERT E. SCHIFTER
BY
Sherman P. Appel
ATTY.

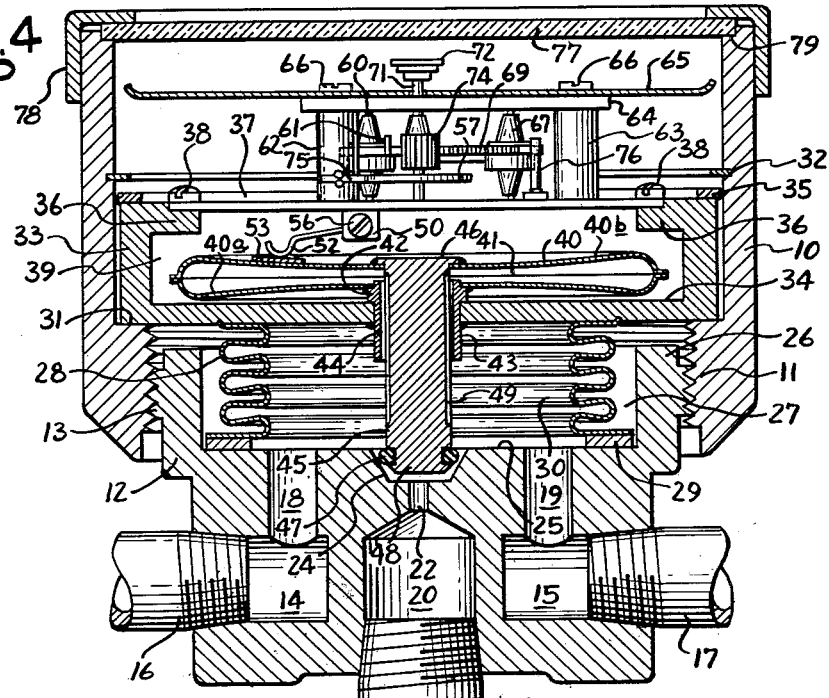
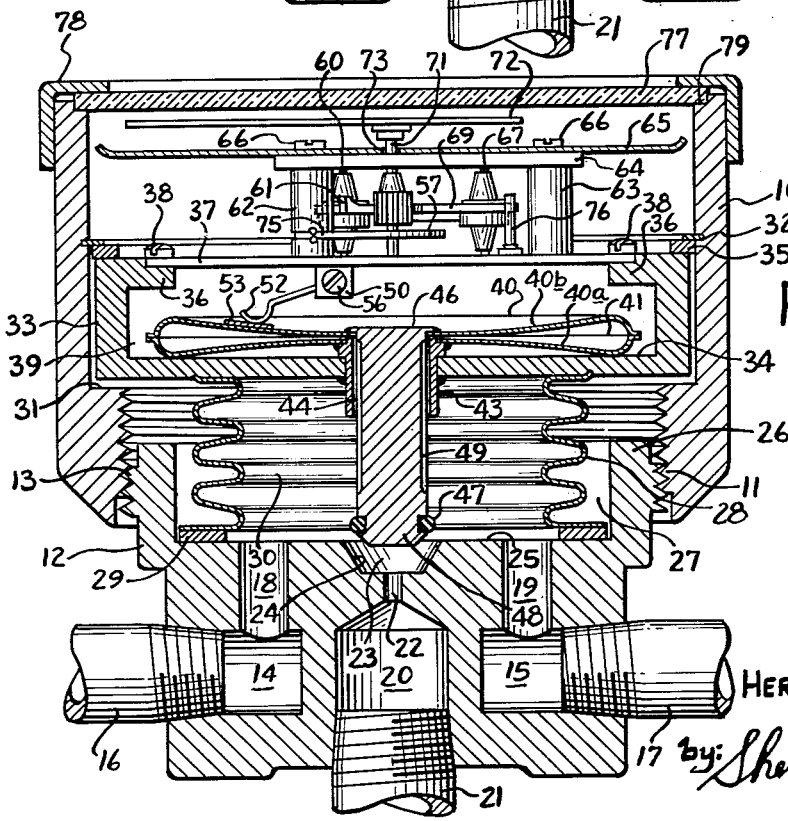
INVENTOR.
HERBERT E. SCHIFTER
by: Sherman P. Appel
ATTY.

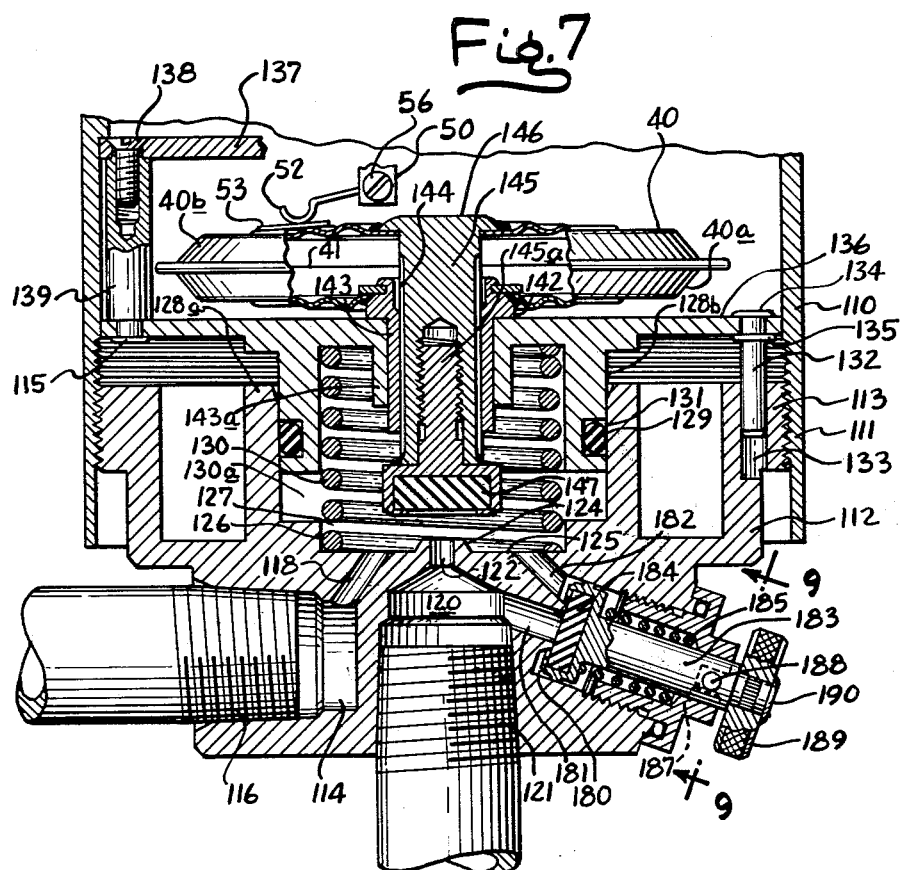
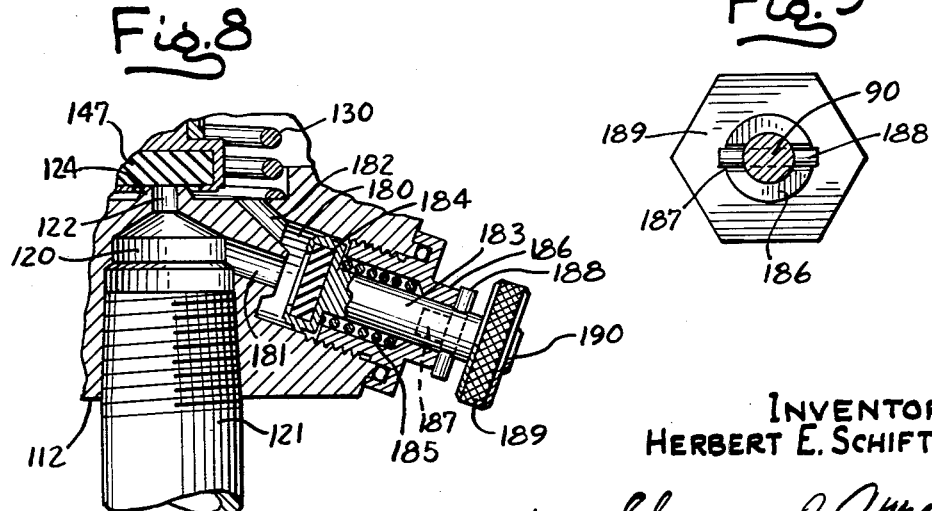

United States Patent Office 3,134,400
Patented May 26, 1964

3,134,400
FLOW REGULATING DEVICE
Herbert E. Schiffer, 1685 Meadow Lane, Bannockburn,
Deerfield, Ill.
Filed Mar. 9, 1961, Ser. No. 94,584
11 Claims. (Cl. 137—557)

This invention relates to suction or pressure regulating devices. Particularly, it relates to adjustable valved flow regulators which are adapted to be operable over a range of flow forces by simple manual adjustment.

Various devices for the purpose of regulating suction force are found in the prior art, and as in the instant invention, these comprise valved structures. The prior devices include expandable or pressure-responsive structures, such as bellows and the like, which are sensitive to pressure applied externally thereto to cause actuation of a reciprocative valve element or stem which is driven into a valve seat to close a vacuum or suction port. These devices found in the prior art are not adaptable readily to operate over a range of suction forces. However, in some of them, adjustment to a fixed position may be made to obtain a desired result at a given vacuum force. Notwithstanding, these devices would not be categorized as adjustable in the sense that the term is used with respect to the instant invention.

The improvements which the instant invention provides distinguish structurally and in result over the prior art in that the invention comprehended herein provides a flow regulating device which comprises a valved mechanism which is intended for normal use over a wide range of flow forces; and setting of the device for a flow force beyond which the force will not be cut off is obtained through the use of a visual indicator such as a suction gauge.

Although the instant invention employs a bellows similar in physical structure to those found in the prior art, the bellows comprehended by this invention is unlike that of the prior art devices in that it is used for the purpose of elongating a chamber through which the valve element or valve stem must pass to close the port in order to cut off the flow. It will be evident that by varying the length of the path through which the valve stem must move, the effective force required to close or throttle the port through the employment of the valved structure can also be varied. Relying upon this principle, therefore, by pre-setting a gauge connected to a pressure-responsive linkage, flow throttling or cut off can be obtained at any selected level.

Accordingly, it is an object of the instant invention to provide a valved structure for regulating flow which is adjustable over a wide range.

It is a further object of this invention to provide the combination of an adjustable valved structure with a gauge whereby setting of the gauge will determine the force by which the flow will be cut off.

For this purpose, and as a further object of this invention, there is provided a longitudinally expandable chamber in which longitudinal adjustment of the chamber is manually made and through which a valve stem moves to throttle a port.

A still further object of the invention is the provision of a valve stem or port closure which is secured to a pressure-responsive casing, the hollow of which communicates with the expandable chamber whereby the valve stem is moved to or away from port through a gastight chamber.

It is a yet further object of the invention that the hollow of the casing and the said chamber have gastight walls to preclude pressure effects other than those resulting from changes in pressure within said chamber and said hollow.

Other and further objects of the invention will become apparent from the following description and appended claims, reference being had to the accompanying drawings and numerals of reference thereon.

On the drawings:

FIG. 1 is a view looking at the top of one embodiment of the invention and showing the gauge face with parts thereof broken away to illustrate the gauge mechanism.

FIG. 2 is a longitudinal sectional view of the device shown in FIG. 1 illustrating the hollow casing and valve stem in zero or neutral position, parts being shown in elevation.

FIG. 3 is a cross-sectional view taken substantially on the line 3—3 of FIG. 2 and looking in the direction of the arrows.

FIG. 4 is a longitudinal sectional view of said device illustrating the valve stem and hollow casing in partial suction cut off or valve throttled position.

FIG. 5 is a longitudinal sectional view of said device under full suction force, however with the valve in open position.

FIG. 6 is a view taken substantially on the line 6—6 of FIG. 1 and looking in the direction of the arrows.

FIG. 7 is a partially sectional view of a modified form of the invention.

FIG. 8 is an enlarged view, in partial section, of the valve bypass mechanism shown in FIG. 7.

FIG. 9 is a view taken substantially on the line 9—9 of FIG. 7 and looking in the direction of the arrows.

Referring now more particularly to the drawings, the flow regulating device illustrated is a suction regulator. It comprises a housing 10 which is of suitable metal fabrication and preferably annular in shape. The housing 10 has an inwardly extending, interiorly threaded annular flange 11 for mounting of a fitting or body member 12. As illustrated in FIGS. 2, 4 and 5, the mounting of body member 12 in the housing 10 is achieved by screwing the threaded flange 11 on the threaded rim 13 of body member 12.

In the embodiment of the invention illustrated, body member 12 is preferably of a suitable metal fabrication, apparent to those skilled in the art; it is provided with interiorly threaded radially disposed bores or wells 14 and 15 adapted to receive fittings 16 and 17 of gas supply lines. Bores 14 and 15 communicatively connect with longitudinally disposed bores 18 and 19 respectively, whereby the gas is sucked or drawn into the device.

For the suction force, there is provided in body member 12 a vertically disposed interiorly threaded bore 20 which is adapted to be connected to an externally threaded fitting 21 of a suction line. The bore 20 communicates with an orifice 22 which connects the bore 20 with the opening 23 defined by valve seat 24 formed in body member 12.

Body member 12 forms a flat 25 which is circumscribed by an upwardly extending annular flange 26 carrying externally thereof the threaded rim 13. Thereby a well 27 is defined above the flat 25 and into which the bores 18 and 19 and opening 23 open to provide respectively two gas inlet ports and a suction port.

An impervious annular bellows or foldable and expandable wall 28 of any suitable fabrication has its lower end secured in a gastight seal to the flat 25. The securance in the preferred embodiment of the invention illustrated is by means of a vacuum sealing ring 29 which is suitably secured on the flat 25 and to which the lower end of the bellows or wall 28 is secured, as illustrated in FIGS. 2, 4 and 5. The ports provided by the bores 18 and 19 and the opening 23 are all wholly within the circumscription of the ring 29 and the bellows 28; and as will be more fully apparent subsequently, all effective pressures thereby are transmitted from the ports and through the chamber 30 defined by the bellows 28.

The inward extension of the thread-carrying flange 11 provides an annular shoulder 31. Spaced upwardly, with respect to the drawings, from the shoulder 31 there is provided an inwardly extending retaining ring or annular boss 32 carried by housing 10. Between boss 32 and shoulder 31 there is disposed a bracket 33 having a centrally apertured flat or table portion 34. The engagement of the table portion 34 with the shoulder 31 limits the movement of bracket 33 downwardly, with respect to the drawings.

The upper end portion of the bellows or wall 28 is secured to the under surface of the table in gastight seal, by any suitable means such as welding or other securance. Upward movement with respect to FIGS. 2, 4 and 5 of bracket 33 is limited by engagement of boss 32 and a bearing member 35 carried on the upper portion of bracket 33, as illustrated.

Bracket 33 has upper inwardly extending flange means 36 to which there is secured the base 37 of a vacuum gauge mechanism to be hereinafter described. The securance is preferably by means of appropriate fastening members such as screws 38.

A chamber 39 is defined by the gauge base 37 and the bracket 33 as illustrated in FIGS. 2, 4 and 5. In the embodiment shown, a casing or shell 40 is disposed in the chamber 39. The casing comprises a pair of opposed shell members 40a and 40b of impervious fabrication and suitably secured together to make hollow or space 41 within the casing 40 gastight. The shell members 40a and 40b are centrally apertured; and shell member 40a rests on and is secured by suitable means such as welding or the like to an upper outwardly extending annular flange 42 of a sleeve 43. Sleeve 43 is disposed about the aperture in shell member 40a in gastight seal, and extends through the central aperture (hereinbefore described) of table 34, as illustrated. Flange 42 functions as a retainer for the sleeve 43 by engagement with the top of table 34 as illustrated in FIGS. 2, 4 and 5. Sleeve 43 is disposed in a manner which centers the same in longitudinal alignment with respect to valve seat 24. To further secure sleeve 43 from movement, and to provide a gastight passage through table 34, sleeve 43 may be welded to the underside of table 34 as illustrated in FIGS. 2, 4 and 5.

A reciprocative main valve stem or valve element 45 extends through sleeve 43 and through the aligned apertures in shell members 40a and 40b. The valve stem 45 is secured by means of a cap or flange 46 which it carries on its upper end to upper shell member 40b. To insure gastight seal of the aperture in shell member 40b, I prefer to weld the flange or cap 46 to the outer surface of said shell member 40b, as illustrated in FIGS. 2, 4 and 5.

By reason of the disposition of the components as herein described, it is seen that sleeve 43 extends into chamber 30. The valve stem 45 extends through sleeve 43 and is adapted to close suction opening 23 with which said valve stem is longitudinally aligned. To insure a gastight seal, when the valved structure is closed, a vacuum type sealing ring 47 is mounted in a nose 48 of the valve stem or valve element 45 as illustrated in FIGS. 2, 4 and 5.

As disclosed in FIGS. 2, 3 and 4, an annular space 44 is provided between the inner surface of sleeve 43 and the outer surface of valve stem 45. However, to further facilitate the passage of gas into or from casing hollow 41, gas passages or grooves 49, only certain of which are numbered, as illustrated in FIGS. 2, 3, 4 and 5, are provided in the valve stem or valve element 45. These grooves extend longitudinally of the valve stem and communicatively connect hollow 41 with chamber 30.

It is apparent from the description that a gastight chamber with inlet and outlet openings only at the ports provided by gas inlet bores 18 and 19 and suction opening 23 is formed by the hollow 41 and the chamber 30 communicatively connected by the space 44 and grooves 49.

As illustrated in the drawings, the base or plate 37 has rigidly secured thereto a pair of depending internally threaded blocks 50. A set screw 55 is mounted in each block 50. Disposed between the inner ends of the screws 55 is a rock shaft 51, the inner ends of the screws bearing against the opposite ends of shaft 51, respectively. The head 56 of the screw 55 is notched, as illustrated in FIGS. 2, 4 and 5, to permit adjustment of the force required to rock or partially rotate shaft 51.

The shaft 51 has secured thereto one end of a force transmissive arm 52 which, at its opposite end, bears against a thin bearing plate 53 which is secured to and carried on shell member 40b. The arm 52 is normally urged into continuous contact with the bearing plate 53 by means of spiral spring 57 which is included in the gauge mechanism to be hereinafter more fully described. Thereby, all relative movement of casing 40 with respect to arm 52 will be transmitted through said arm to the rockable shaft 51.

The vacuum gauge and its operable mechanism is conventional, and accordingly, it is not intended to limit the invention to any specific gauge construction. It will be appreciated that various vacuum gauge constructions can be used with the invention. I have found the gauge illustrated to be adequate.

In the embodiment of the invention illustrated in the drawings, a pin 54 extends upwardly with respect to the drawings. This pin is clearly seen in FIGS. 1 and 6. Its lower end is rigidly secured to shaft 51 and rocks to the right and left with respect to FIG. 1 as the shaft 51 is correspondingly rocked by changes in position of the arm 52. The pin 54 extends through a slot 58 which is medially disposed in a bent link 59. The link 59 at one end portion thereof is pivotally mounted on pivot pin 60. A boss 61 is provided by a free end portion of the link 59, and limits the range of movement of the link 59 to the right with respect to FIG. 1 by engagement with post 62. The post 62 forms one of a pair of spaced posts, the other of which is identified by the numeral 63. The lower ends of these posts 62 and 63 are rigidly secured to base plate 37 in any suitable fashion. The upper ends of post 62 and post 63 support a plate 64 to which said posts are rigidly secured.

A dial, gauge face or plate 65, bearing graduated markings or indicia, is carried on the top of plate 64 as illustrated in FIGS. 2, 4 and 5. Plate 65 is secured to the top of plate 64 by suitable securance means, such as screws or the like 66. The top of the pivot pin 60 is rigidly secured in plate 64 as is the top of a second pivot pin 67 which is spaced from pivot pin 60, as illustrated in the drawings. The lower end of each pivot pin 60 and 67 is rigidly secured in the plate 37. The pin 67 provides the pivot for a rocking member having a link end 68 and a rack gear end 69. The link end 68 is secured to link 59 by means of an intermediate force transmission link 70. The opposite ends of link 70 are pivotally secured to link 59, and the link end 68, as illustrated at 67a and 67b in FIGS. 1 and 5.

An indicator support pin 71 has rigidly secured to its upper end an indicator needle 72. Pin 71 passes through an aperture 73 therefor in the dial face or plate 65, and is journalled in the spaced-apart plate 64 and gauge base 37, being suitably retained in any appropriate fashion. In alignment with the rack gear end 69, the meshing teeth of which are arcuately disposed, as illustrated in FIG. 1, a gear 74 is secured on the pin 71 to rotate therewith.

As also indicated in and illustrated by the drawings, the inner end of a spiral spring 57 is anchored to pin 71 with its outer end 75 being rigidly secured to post 62. The spring 57 is an expansion-type spring, and when under no suction force, has rotated pin 71 to its clockwise limit, the limit being determined by a boss 76 illustrated in FIGS. 2, 4 and 5, which stops the movement of the rack gear end 69 by abutment with the end thereof. Rack gear end 69 operably meshes with the gear 74.

The operating force between the rock shaft 51 and rack gear end 69 is transmitted through the linkage comprising the link 59, the intermediate force transmission link 70, and the link end 68, and the pin 54.

The normally upper end of the housing 10 is preferably circular and is provided with an upper annular shoulder 79 which supports transparent cover glass 77. The cover glass is held in place on the shoulder 79 by a suitable retainer 78 which may be mounted as illustrated in the drawings and secured in any suitable fashion, obvious to one skilled in the art.

The device is adapted for use in sucking up and disposing of debris during surgical operations. When used in such fashion, the fittings 16 and 17, respectively, provide the inner ends of suction lines, the outer ends (not shown) of which draw from the atmosphere. Accordingly, surgical debris is sucked away by means of the suction force pulling through fitting 21. Usually full-line suction during the course of surgery is undesirable and, therefore, the line force must be lowered. In the instant device, any desired degree of throttling of line suction force may be achieved. For such purpose, the housing 10 which is shown in FIG. 2 under no vacuum force, is manually rotated on its threads to elevate the housing a maximal distance on the body member 12 to the position shown in FIG. 5. This, of course, elongates the bellows or collapsible wall 28, and the normal disposition of components holds the valve stem or valve element 45 out of seat 24.

In this position, the casing 40 is neither distended nor contracted, and arm 52 is in a position of zero pressure, atmospheric pressure being considered zero for the purpose of this illustration. Accordingly, the indicator needle 72 registers zero. It will be appreciated that the gauge mechanism is pre-set by the manufacturer.

Now then, with neither pressure above, nor vacuum below, atmospheric, whether the housing 10 is moved upwardly or downwardly with respect to body member 12, the casing 40 will neither contract nor expand, and accordingly, the arm 52 will hold its zero setting. That is to say, the position of arm 52 is not affected by upward or downward movement of housing 10. It will be observed, therefore, that regardless of the relative positions of housing 10 and fitting or body member 12, the position of arm 52 is the same, with the indicator needle 72 registering zero under zero pressure, as long as housing 10 has not been screwed downwardly to the position in which nose 48 of valve stem or valve element 45 is abutting or pushing against seat 24.

Now, the vacuum line is opened and assume, for example, that it is intended to mop up or suck in debris at 100 millimeters of negative pressure or vacuum.

Inasmuch as the vacuum will be substantially more than desired, as conventional vacuum pumps will pull as much as 27 inches of vacuum, it is necessary to occlude the vacuum line to reduce the suction force. It will be appreciated, of course, that the suction force introduced through the line 21 will be exerted through the construction to withdraw the debris through lines 16 and 17, through the wells or bores 14 and 15, and through bores 18 and 19. Upon opening the vacuum line completely, valve stem or valve element 45 will be sucked down by reason of the great suction force over atmosphere as illustrated in FIG. 5.

Bearing in mind that bellows 28 has been distended longitudinally to a maximum position of separation or spacing of table 34 of the flat 25, regardless of the suction, then, it will be impossible for valve stem 45 to close or seal opening 22, as the valve stem is not long enough to permit its seating in the seat 24. Under such conditions, valve stem 45 will be drawn downwardly toward its seat, although not into same, bracket 33 will be drawn against the shoulder 31, to the bracket position of FIG. 4, and hollow 41 will tend to be evacuated, causing contraction of the casing 40. This, in turn, will cause arm 52 to drop under the action of expansion spring 57. The position of the bracket 33 shown in FIG. 5 is just before it is forced toward shoulder 31.

As arm 52 drops, rockable shaft 51 will be rotated counterclockwise, carrying pin 54 to the left. As pin 54 moves to the left, it draws with it arm 59, the intermediate force transmission link 70, and link end 68. The rack gear end 69 is accordingly moved counterclockwise, and gear 74 is moved clockwise with respect to FIG. 1. This causes the indicator needle 72 to register maximum suction.

Now, to reduce the effective suction to the desired level—in the assumed instance, 100 millimeters—the housing member 10 is rotated downwardly on its threads toward fitting or body member 12 to reduce the spacing between table 34 and the flat 25. This, of course, causes contraction of the bellows 28 and the shortening of chamber 30. Bracket 33 is simultaneously held against shoulder 31 under the partial vacuum force. Continued shortening of chamber 30 gradually introduces the nose 48 into seat 24 to gradually occlude opening 23 and gradually cut off or throttle the suction. When the suction has been cut off to a gauge reading of 100, relative rotation of housing 10 and body member 12 is stopped; and as long as the suction force introduced through the aperture 22 remains constant, the gauge will continue to read 100.

As the suction force is reduced, in the manner aforesaid, the effect is transmitted through chamber 30 and into the hollow 41 causing a gradual expansion of the casing 40 to suction-throttled position as illustrated in FIG. 4.

Accordingly, arm 52 elevates to rock the shaft 51 clockwise with respect to FIGS. 1, 2, 4 and 5, against the force of spring 57. This force is transmitted through pin 54 through the linkage of links 59 and 70 and link end 68 to the rack gear 69 which rotates gear 74 to cause pin 71 to carry the indicator needle 72 to said gauge reading.

In the event of an increase in vacuum force above the desired level, the valve stem 45 will be able to completely close off the vacuum line by being pulled into the seat 24. This is now possible because the diaphragm 40 is able to contract under the increased suction and thereby lower the stem 45.

It will be appreciated that the practical limit to the evacuation lines through which debris may be collected by a single device in accordance with the instant invention will be determined by the number of air line bores like 14–18, 15–19 provided in body member 12.

A modified form of the invention is illustrated in FIGS. 7, 8 and 9. In addition to the modification of the construction of the suction throttling device, which is within the scope of the invention, there is also provided a valved bypass which is adapted to quickly bring to bear full line suction without disturbing the setting of the throttling mechanism. This bypass is used, for example, in the event, during surgery, a sudden accumulation of debris should occur because of unexpected cutting of a small blood vessel. That would cause a sudden accumulation of material which had to be removed more quickly than would be possible with the regulator in its selected throttled setting.

More particularly, the modification illustrated in FIG. 7 comprises a housing 110 which has interior threads 111 threadingly mounted on the externally threaded flange 113 of a fitting or body member 112. In this modified form of the invention, body member 112 is provided with a radially disposed bore 114 which is adapted to receive fitting of a gas supply line 116. The bore 114 communicatively connects with an angularly disposed bore 118 whereby gas or other material being evacuated is sucked or drawn into the device.

For the suction force, there is provided in body member 112 a vertically disposed bore 120 which is adapted to connect to fitting of a suction line 121. The bore 120 communicates with an orifice 122 which is defined by a raised valve seat 124 formed in the body member 112. An annular flat 125 is provided by body member 112 about the elevation of the valve seat 124 and said flat 125 is circumscribed by a normally extending shoulder 126. The flat 125 and shoulder 126 act to retain the lower end of an expansion spring 130 in a well 127 in the manner illustrated in FIG. 7. The well 127 communicatively connects with pressure and suction sides of the device through the respective bores 118 and 122.

The equivalent of the expandable wall or bellows shown in FIGS. 2, 4 and 5 is provided in the modified form of FIG. 7 by a structure comprising a pair of telescopic components 128a and 128b. The component 128a is provided by an annular wall which extends upwardly from the shoulder 126. The telescopic component 128b is carried by the housing 110 and comprises an annular wall slidable against the inner surface of the telescopic component 128a. To preclude the drawing in of gases between the walls 128a and 128b, a sealing ring 129 is carried in an annular slot 131 formed in the telescopic component 128b as illustrated in FIG. 7. The telescopic component 128b is an extension of a transversely extending plate 136 which is secured within the housing 110.

Accordingly, it will be apparent that the device may be elongated or contracted by the appropriate rotation of the housing 110 and the body member 112 one about the other to thereby cause expansion and contraction of the bellows provided by the telescopic components 128a and 128b. To facilitate the proper alignment of the housing 110 and body member 112 during adjustment thereof, a dowel pin 132 extends into an arcuately shaped slot 133 which is formed in body member 112 as illustrated in FIG. 7. The upper end of dowel pin 132 is secured to the plate 136 by means of its fiange cap 134 and a flange 135 rigidly secured to the pin 132 and to plate 136 immediately underneath the plate 136.

The upper end of the spring 130 bears against the plate 136 within the circumscription of wall or telescopic component 128b, and this spring 130 tends to force the bellows to expanded position.

The casing 40 as used in the embodiment illustrated in FIG. 7 is rigidly carried between the annular plate 136 and an annular member 137. The member 137 is secured in its position by fasteners such as screw 138 threaded into spacers 139, one of which is shown in FIG. 7, with each spacer secured by a fastener 115 to the plate 136 in the manner illustrated. The gauge mechanism is not shown in FIG. 7 but is like that illustrated with respect to the embodiment of the invention described in connection with FIGS. 2, 4 and 5, with actuation of the gauge occurring through the force exerted on the casing 40 and transmitted through the arm 52.

The shell member 40a of casing 40 is secured in airtight seal to flange 142 which supports the casing 40 above the transversely extending plate 136. Plate 136 is centrally apertured and a bearing sleeve 143 integral with the flange 142 extends through the aperture in plate 136. The sleeve 143 is reinforced by an annular flange 143a, normal to and integral with the plate 136, said flange 143a being mounted on the outer wall of said sleeve 143 in the manner illustrated.

A reciprocative main valve stem or valve element 145 extends through the sleeve 143 and through the aligned apertures in shell members 40a and 40b. Valve stem 145 is secured by means of a cap or flange 146 which carries upon its upper end to the upper shell member 40b. To insure gastight seal of the aperture in shell member 40b, the cap 146 may be welded to the outer surface of such shell member 40b as illustrated in FIG. 7. By reason of the disposition of components described in connection with FIG. 7, it is seen that the sleeve 143 extends into the chamber 130a which is the chamber defined by the bellows and within the telescopic components 128a and 128b. Chamber 130a, of course, communicatively connects with the well 127 and accordingly with the aperture 122 and the bore 118.

The valve stem 145 in the embodiment shown in FIG. 7 has an upwardly threaded centrally disposed bore aligned with the aperture 122. A valve stem extension 145a is adjustably mounted in the bore of the valve stem 145 whereby adjustments in the length of the valve stem 145 may be made. The valve stem, at its lower end with respect to FIG. 7, carries a cap 147 which comprises a plug of sealing material and which is adapted to throttle or close aperture 122. An annular space 144 is provided between the inner surface of sleeve 143 and the valve stem 145.

The foregoing construction described in connection with FIG. 7 provides a gastight chamber with inlet and outlet openings only at the ports provided in the body member 112. This gastight chamber is formed by the hollow 41 in the casing 40, the chamber 130a and the well 127 communicatively connected by the space 144.

The operation of the device shown in FIG. 7 is substantially the same as the operation of the device shown in the previous figs.; however, it may be desirable to provide a bypass for the throttled valve without disturbing the setting thereof as previously indicated. To do this, then, I have provided in the body member 112 a well 180 seen in FIGS. 7 and 8. The well 180 is directly communicatively connected by a passage 181 to the bore 120. The well 180 is also directly communicatively connected to the well 127 and chamber 130a by a passage 182. Valve stem 183, slidable in the well 180, is provided with an aperture sealing head 184. A compression spring 185 mounted about the valve stem 183 urges the valve stem into the position shown in FIG. 7 so that the head 184 seals the aperture or passage 181 at its juncture with the well 180.

The body member 112 provides a shoulder 186 which defines the well 180. Shoulder 186 has a pair of opposed slots 187 shown in FIG. 9 and in dotted lines in FIGS. 7 and 8. The valve stem 183 carries a pair of pins 188 which ride in the slots 187. If suddenly a requirement is had for full line vacuum, the knurled handle 189, which is carried on the outer end of the valve stem 183 by means of a fastener such as that seen as 190, is pulled outwardly against the action of the spring to unseat the valve head 184 from the passage 181 and accordingly, the pins 188 are slid outwardly from the slots 187 and disengaged therefrom. By then turning the knurled handle 189 a half turn, the pins 188 will be held out of the slots 187 and on the shoulder 186 to retain the passage 181 open. The full vacuum force is then exerted through the passage 182 through the well 127 through the bore 118 on the vacuum line 116. This, of course, will result in complete closure of aperture 122, for reasons hereinbefore described, as illustrated in FIG. 8; however, the original valve setting is not disturbed. Therefore, as soon as the requirement for full line suction is over, passage 181 may be quickly closed and the valve 183 returned to the position shown in FIG. 7. Then, of course, by reason of the original setting, aperture 122 will be throttled according to its initial setting as hereinbefore described for the setting of the main valve stem.

As many changes or substitutions could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

I claim:

1. A flow regulating device comprising a housing having outlet and fluid inlet ports; an expansible wall which with said housing defines a gastight chamber about said ports;

a valve element reciprocative within said chamber to open and close one of said ports;

a pressure responsive component disposed within said housing;

means adjustably spacing said component from said last mentioned port;

said pressure responsive component being operably connected to said valve element whereby the force to close said last mentioned port may be selectively varied.

2. The structure as defined in claim 1 wherein means are provided to limit the motion of a portion of said pressure responsive component toward the last mentioned port.

3. A regulating device as defined in claim 1 in which the pressure responsive component comprises a casing having a space therein communicatively connected with said chamber.

4. A regulating device as defined in claim 3 in which the communicative connection between the casing space and said chamber is by means of a passage defined by said valve element.

5. A regulating device as defined in claim 1 in which the adjustable spacing from the last-mentioned port of the pressure responsive component is by means of a relatively inwardly and outwardly movable body defining said last-mentioned port.

6. A regulating device as defined in claim 5 in which one end of said expansible wall is connected to said inwardly and outwardly movable body whereby the length of said chamber is adjusted.

7. A flow regulating device comprising a housing; an inwardly and outwardly adjustable body mounted in one end portion of said housing, said body defining gas inlet and outlet ports; a hollow pressure responsive casing secured in said housing; a reciprocative valve element operably secured to said casing in alignment with and adapted to close one of said ports; a wall expandable and contractible in the direction of movement of said valve element and having one end portion disposed in a gastight seal in said body about said ports; a bracket mounted in said housing and providing a bearing for said valve element, the other end of said wall secured in an airtight seal to said bracket, said valve element defining a gas passage from within said wall to the hollow of said casing, said casing and valve stem movable independently of said wall whereby the distance required for said valve stem to travel may be selectively varied.

8. A flow regulating device comprising a housing; an inwardly and outwardly adjustable body mounted on one end portion of said housing, said body having gas inlet and outlet ports; longitudinally expandable gastight means having one end disposed in said body and defining a chamber within said housing communicatively connected with said ports; a valve element adapted to open and close said one of said ports operably connected to said gastight means and extending toward such last-mentioned port, said gastight means secured to said body about said ports, whereby upon adjustment of said body the length of the chamber may be selectively varied.

9. A suction regulating device comprising a housing; an inwardly and outwardly manually movable body mounted in one end of said housing, said body having gas inlet and suction ports; an apertured bracket disposed in said housing spaced from said body; a hollow pressure responsive casing carried by said bracket; a valve element secured to said casing and extending through said bracket aperture, said valve element adapted to close and open said suction port; an expansible bellows member disposed about said valve element and said ports and secured to said bracket and said body in an airtight seal, said valve element defining a passage communicatively connecting the bellows and the casing, said casing inflatable and contractible independently of said bellows, and a suction gauge including a force transmissive link operably connected to said casing whereby the spacing of the inlet port from the casing may be selectively varied to preclude the valve element from closing the inlet port below a given suction force by adjustment of said body.

10. A flow regulating device comprising a housing, an expansible and contractible structure within said housing and having fluid inlet and outlet ports, said structure defining a chamber, a hollow pressure-responsive casing disposed within said housing, means causing the casing to be inflated and deflated independently of the expansion and contraction of said structure; a valve stem secured at one end to said casing and having a portion thereof extended toward one of said ports, and means communicatively connecting the chamber and hollow of said casing whereby pressure changes affecting said casing will drive said valve stem to and away from said last mentioned port.

11. A flow regulating device comprising a housing having fluid inlet and outlet ports; a bellows disposed in said housing, said bellows comprising a pair of independently expansible and contractible portions and a medial inflexible portion; means for limiting the motion of said medial portion toward the outlet port; a valve stem secured at one end to a first of said bellows portions and having a valve portion extending into the second of said bellows portions toward one of said ports whereby pressure changes affecting said first bellows portion will drive said valve stem to and away from said last mentioned port.

References Cited in the file of this patent

UNITED STATES PATENTS

| | | |
|---|---|---|
| 540,603 | Verrue | June 4, 1895 |
| 769,482 | Kleinfeldt | Sept. 6, 1904 |
| 1,271,625 | Snyder | July 9, 1918 |
| 1,697,865 | Hahn | Jan. 8, 1929 |
| 2,035,025 | Segur | Mar. 24, 1936 |
| 2,278,728 | McKinley | Apr. 7, 1942 |
| 2,318,157 | Heiser | May 4, 1943 |
| 2,894,532 | Gaylord | July 14, 1959 |

FOREIGN PATENTS

| | | |
|---|---|---|
| 68,479 | Germany | May 6, 1892 |
| 738,773 | Great Britain | Oct. 19, 1955 |